(12) United States Patent
Bender

(10) Patent No.: US 11,370,557 B2
(45) Date of Patent: Jun. 28, 2022

(54) AIRCRAFT

(71) Applicant: Dr. Ing. h.c. F. Porsche Aktiengesellschaft, Stuttgart (DE)

(72) Inventor: Stefan Bender, Löchgau (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 526 days.

(21) Appl. No.: 16/502,331

(22) Filed: Jul. 3, 2019

(65) Prior Publication Data

US 2020/0010209 A1 Jan. 9, 2020

(30) Foreign Application Priority Data

Jul. 4, 2018 (DE) .......................... 102018116146.8

(51) Int. Cl.
| | |
|---|---|
| B64D 33/08 | (2006.01) |
| B64D 33/10 | (2006.01) |
| B64C 29/00 | (2006.01) |
| B64C 39/02 | (2006.01) |
| F28F 21/02 | (2006.01) |
| B64D 27/24 | (2006.01) |

(52) U.S. Cl.
CPC .......... B64D 33/10 (2013.01); B64C 29/0025 (2013.01); B64C 29/0033 (2013.01); B64C 39/024 (2013.01); B64D 27/24 (2013.01); F28F 21/02 (2013.01); *B64C 2201/042* (2013.01); *B64C 2201/108* (2013.01); *B64C 2201/141* (2013.01)

(58) Field of Classification Search
CPC .... B64D 33/08; B64D 27/24; B64C 2201/042
See application file for complete search history.

(56) References Cited

U.S. PATENT DOCUMENTS

| | | | |
|---|---|---|---|
| 3,937,424 A * | 2/1976 | Meier | ................. H01M 50/00 |
| | | | 429/99 |
| 4,635,709 A | 1/1987 | Altoz | |
| 8,967,529 B1 * | 3/2015 | Bennett | ................. B64D 27/24 |
| | | | 446/57 |
| 9,162,770 B2 | 10/2015 | Stückl et al. | |
| 10,029,789 B2 | 7/2018 | Liu et al. | |
| 10,252,798 B2 * | 4/2019 | Petrov | ....................... B64C 3/38 |
| 10,236,543 B2 | 9/2019 | Dyer et al. | |
| 2004/0211862 A1 * | 10/2004 | Elam | ..................... B64D 27/24 |
| | | | 244/58 |
| 2015/0000523 A1 | 1/2015 | Jojic et al. | |

(Continued)

FOREIGN PATENT DOCUMENTS

| | | |
|---|---|---|
| DE | 2357286 A1 | 5/1975 |
| DE | 202010016892 U1 | 8/2011 |

(Continued)

OTHER PUBLICATIONS

Notification of Reason for Rejection for Japanese Application No. 2019-123328, dated Jul. 28, 2020, with translation, 10 pages.

*Primary Examiner* — Richard G Davis

(74) *Attorney, Agent, or Firm* — RatnerPrestia

(57) ABSTRACT

An aircraft includes a battery, an airfoil and heat conducting elements, and the heat conducting elements connect the battery thermally to the airfoil in such a way that heat which is produced in the battery is distributed to the airfoil.

14 Claims, 5 Drawing Sheets

(56) References Cited

U.S. PATENT DOCUMENTS

| | | | |
|---|---|---|---|
| 2015/0053663 A1 | 2/2015 | Sakota et al. | |
| 2015/0136897 A1 | 5/2015 | Seibel et al. | |
| 2015/0298799 A1 | 10/2015 | Bertrand et al. | |
| 2016/0167796 A1* | 6/2016 | Joubert | B64D 41/00 903/951 |
| 2018/0072431 A1 | 3/2018 | Sahu et al. | |
| 2019/0375492 A1* | 12/2019 | Lee | B64C 11/46 |

FOREIGN PATENT DOCUMENTS

| | | |
|---|---|---|
| DE | 102011105880 A1 | 12/2012 |
| DE | 112012003115 T5 | 8/2014 |
| DE | 202015003815 U1 | 7/2015 |
| DE | 202015007089 U1 | 11/2015 |
| DE | 202018000856 U1 | 3/2018 |
| EP | 1764302 A2 | 3/2007 |
| GB | 2555400 A | 5/2018 |
| JP | 2017501475 A | 1/2017 |
| JP | 2017528355 A | 9/2017 |
| KR | 20180069594 A | 6/2018 |
| WO | 2016028358 A2 | 2/2016 |

* cited by examiner

AIRCRAFT

CROSS-REFERENCE TO RELATED APPLICATION

This application claims priority to German Patent Application No. 10 2018 116 146.8, filed Jul. 4, 2018, the content of such application being incorporated by reference herein in its entirety.

FIELD OF THE INVENTION

The present invention relates to an aircraft, in particular a fully electric aircraft which is capable of taking off and landing vertically (vertical take-off and landing, VTOL).

BACKGROUND OF THE INVENTION

In aerospace technology, VTOL denotes, across all languages, any type of aircraft, drone or rocket which has the capability to take off and land again substantially vertically and without a runway. In the following text, this collective term is used in a broad sense which includes not only fixed airfoil aircraft with airfoils, but also rotary airfoil aircraft such as helicopters, gyrocopters, gyrodynes and hybrids such as compound helicopters or compound gyroplanes and convertiplanes. Furthermore, aircraft are to be included with the capability of taking off and landing in particularly short distances (short take-off and landing, STOL), taking off in short distances but landing vertically (short take-off and vertical landing, STOVL) or taking off vertically but landing horizontally (vertical take-off and horizontal landing, VTHL).

In order to cool an aircraft, U.S. Pat. No. 4,635,709A, which is incorporated by reference herein, proposes a cooling plate below the airfoil for dissipating heat from the electronic components and cooling fins for dissipating the heat which is output by the cooling plate into the cooling air stream. In addition, a liquid coolant is provided in cavities which are configured in the cooling plate directly next to the electronic components.

Said liquid coolant evaporates at elevated temperatures when the cooling air stream is not available, in order to cool the cold plate. The steam which is released by way of the evaporation of the liquid coolant is ejected from the heat exchanging apparatus through a hydrophobic filter membrane which covers a part of the cavities. The hydrophobic membrane is impermeable for liquids, but is permeable to gas.

EP1764302A2, which is incorporated by reference herein, also discloses a passive cooling system for a wing. The passive cooling system comprises a fluid transmission chamber which is adjacent with respect to the wing. A fluid transmission element and coolant are arranged in the fluid transmission chamber. The fluid transmission element conducts a part of the coolant to the wing which dissipates the thermal energy.

Finally, US20150000523A1, which is incorporated by reference herein, describes an aircraft fuel tank flammability reduction method by way of the feeding of compressed air into an air separation module which contains an oxygen separating membrane. The method comprises bringing the separating membrane into contact with the air feed, the penetrating of oxygen from the air feed through the separating membrane, and the generating of nitrogen-enriched air from the air separating module as a consequence of the removal of oxygen from the air feed. The enriched air from the air separating module is cooled in a flow heat exchanger in the wing and is fed to the fuel tank.

SUMMARY OF THE INVENTION

Described herein is an aircraft, in particular a fully electric aircraft which is capable of taking off and landing vertically. The aircraft has a battery, an airfoil and heat conducting elements, and the heat conducting elements connect the battery thermally to the airfoil in such a way that heat which is produced in the battery is distributed to the airfoil.

Benefits of this aircraft lie in its reduced complexity in comparison with active cooling systems and the correspondingly reduced weight of the resulting aircraft.

The aircraft can be equipped with folded or even selectively foldable airfoils. One corresponding variant enlarges the wing area which is active during horizontal flying, without increasing the footprint of the aircraft, however.

Furthermore, the aircraft may have a rapidly chargeable battery system which provides the drive energy for vertical take off and landing and horizontal flying, and makes brief charging of the aircraft at a standstill possible.

Here, in order to drive the aircraft, instead of exposed rotors, a plurality of ducted fans, even of different size, can be used, as are known away from aeronautical engineering, for instance from hovercrafts or airboats. In an embodiment of this type, the cylindrical housing which surrounds the propeller is capable of considerably reducing the thrust losses as a consequence of vortices at the blade tips. Suitable ducted fans may be oriented horizontally or vertically, may be configured such that they can be pivoted between the two positions or, for aerodynamic reasons, may be covered by way of louvers during horizontal flying. In addition, a pure horizontal thrust generation by means of stationary ducted fans is conceivable.

Finally, in addition to preferably fully autonomous operation of the aircraft, the granting of manual control to human pilots with sufficient qualifications also comes into consideration, which imparts the greatest possible flexibility in terms of handling to the apparatus according to aspects of the invention.

BRIEF DESCRIPTION OF THE DRAWING

One exemplary embodiment of the invention is shown in the drawing and will be described in greater detail in the following text.

DETAILED DESCRIPTION OF THE INVENTION

The terms 'fan,' 'rotor' and 'propeller' may be used interchangeably herein.

Figure 1:
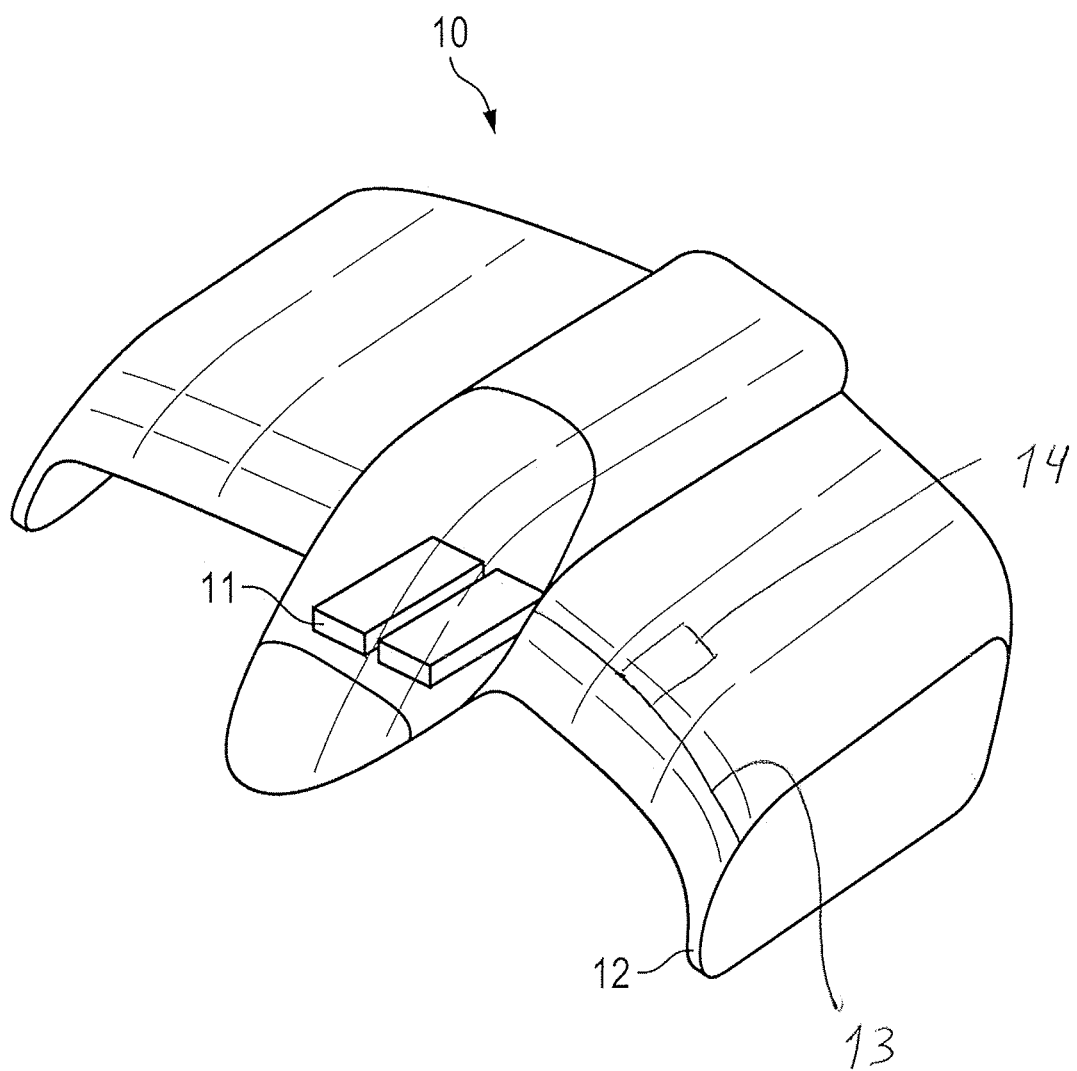
FIG. 1 shows the perspective view of an aircraft.

FIG. 1 illustrates the structural features of one preferred refinement of the battery-electric aircraft 10 according to aspects of the invention, the heat management of which can be regulated via the airfoil 12 which is distributed substantially to its wings on both sides.

To this end, in addition to a high voltage battery 11 which is used for the drive, the aircraft 10 has heat conducting elements 13 which connect the battery 11 thermally to the airfoil 12 in such a way that the heat which is unavoidably produced in the battery 11 during flying operation is distributed as homogeneously as possible to the airfoil 12. The airfoil 12 which is flowed around to a pronounced extent during flying acts as a heat exchanger in this way.

Guide plates 14, silicone, mica, aluminum oxide or other ceramic, polyimide (Kapton®), metal foil or graphite foil may be used, for example, as heat conducting elements 13.

Figure 2:
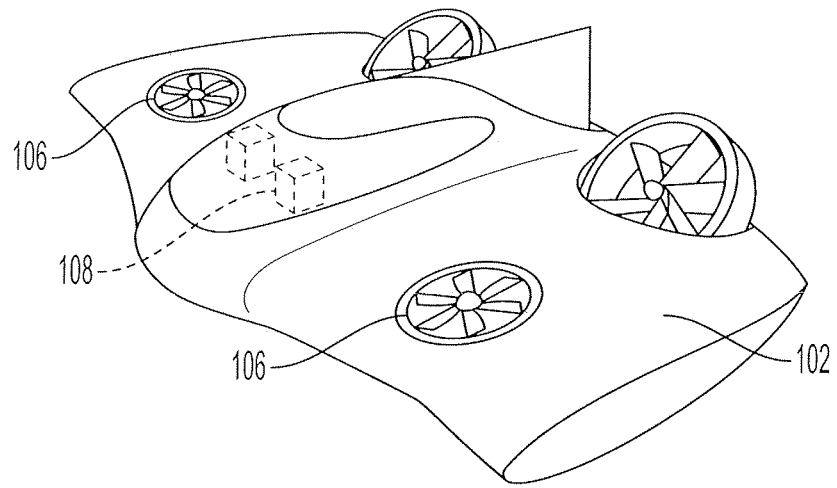
FIG. 2 depicts an isometric view of an aircraft, wherein the wings are shown in an extended configuration and the rear propellers are shown in an angled orientation.
Figure 3:
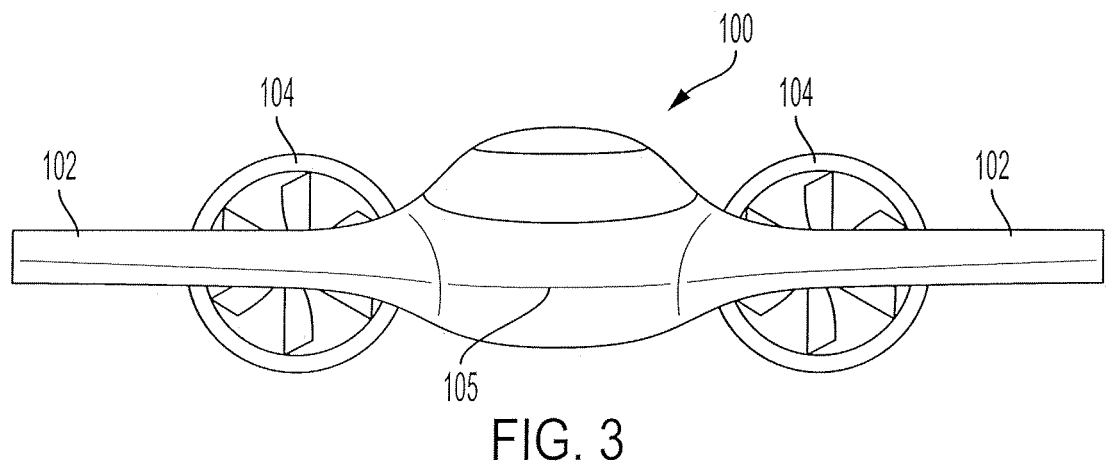
FIG. 3 depicts a front elevation view of the aircraft of FIG. 2, wherein the wings are shown extended configuration and the rear propellers are shown in a cruising orientation.
Figure 4:
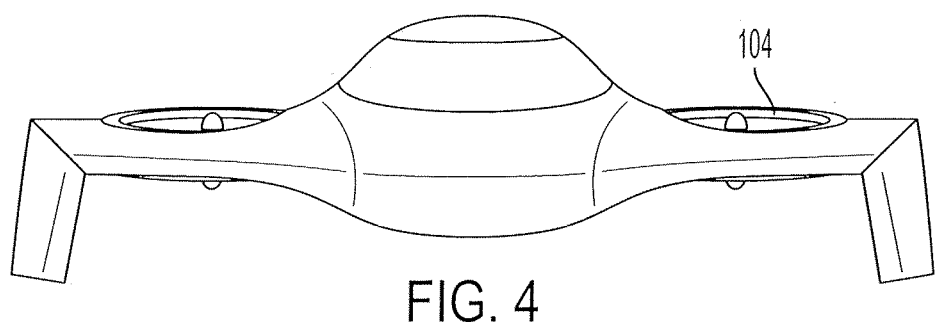
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft, however, many (if not all) of the details of the previously described aircraft also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions. Alternatively, the propellers 104 may be immovable and fixed in a vertical position, as shown in FIG. 2.

Horizontally mounted propellers 106 are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
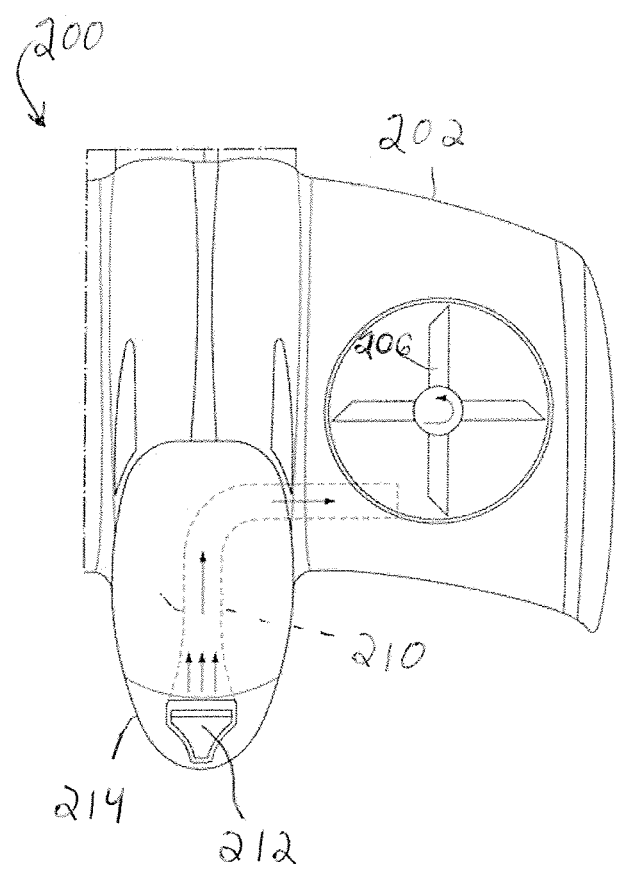
FIG. 5 depicts a top plan view of a portion of an aircraft, showing an internal duct extending between a nose of the aircraft and a horizontal fan mounted to the wing.
Figure 6:
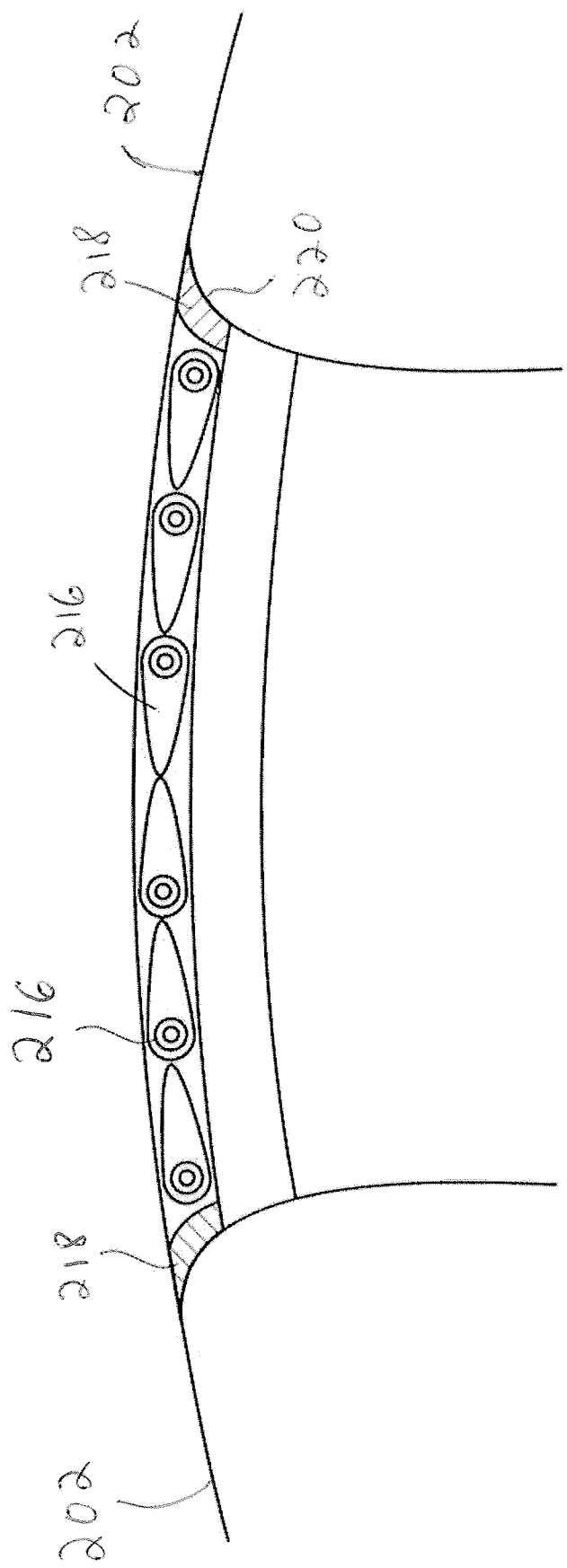
FIG. 6 depicts moveable louvers applied on top of the horizontal fan of FIG. 5, wherein the louvers are shown in a closed position.
Figure 7:
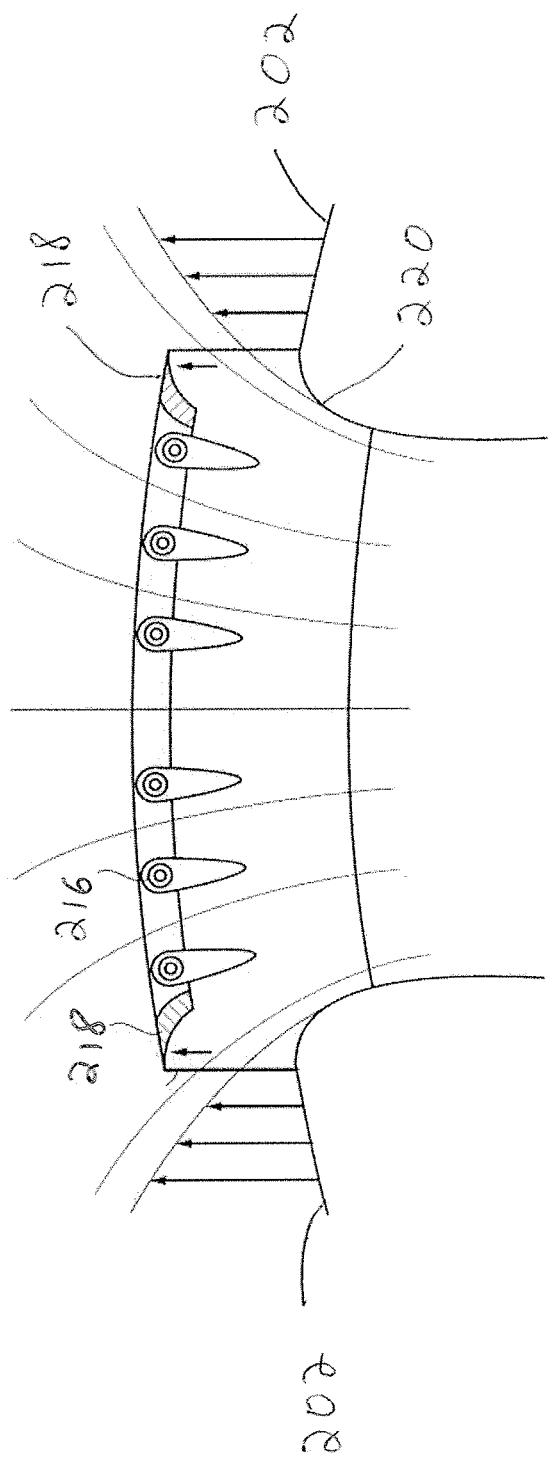
FIG. 7 depicts the movable louvers of FIG. 6, wherein the louvers are shown in an open position.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is to noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft comprising:
   an airfoil including a fuselage and wings extending from opposing sides of the fuselage;
   fans on the wings for generating propulsion to move the aircraft during operation;
   a battery positioned entirely within the fuselage, the battery being connected to the fans for powering the fans; and
   heat conducting elements, wherein the heat conducting elements thermally connect the battery to the wings of the airfoil in such a way that heat, which is produced in the battery, is distributed to the wings of the airfoil during operation.

2. The aircraft as claimed in claim 1, wherein the heat conducting elements comprise guide plates.

3. The aircraft as claimed in claim 1, wherein the heat conducting elements comprise graphite foil.

4. The aircraft as claimed in claim 1, wherein the aircraft has a fully electric drive.

5. The aircraft as claimed in claim 1, wherein the aircraft comprises folded or foldable airfoils.

6. The aircraft as claimed in claim 1, wherein the aircraft comprises a chargeable battery system.

7. The aircraft as claimed in claim 1, wherein the fans are horizontally fixed ducted fans for take off and landing.

8. The aircraft as claimed in claim 7, wherein the aircraft has louvers, and the louvers are configured to selectively cover the horizontal ducted fans.

9. The aircraft as claimed in claim 1, wherein the fans are vertically fixed ducted fans for generating propulsion.

10. The aircraft as claimed in claim 1, wherein the aircraft is configured to be selectively controlled in a fully autonomous manner.

11. The aircraft as claimed in claim 1, wherein the heat conducting elements extend across an entire length of one of the wings.

12. The aircraft as claimed in claim 11, wherein the heat conducting elements comprises guide plates arranged on an exterior surface of said one of the wings.

13. The aircraft as claimed in claim 12, wherein each guide plate is composed of silicone, mica, aluminum oxide, metal foil or graphite foil.

14. The aircraft as claimed in claim 1, wherein each wing includes one horizontally fixed ducted fan for generating propulsion in a vertical direction and one fan that is configured to pivot between a vertical position for generating propulsion in a horizontal direction and a horizontal position for generating propulsion in a vertical direction.

\* \* \* \* \*